3,003,995
STABILIZED POLYCAPROAMIDE COMPOSITIONS
Elmer C. Schule, Morris Plains, N.J., assignor to Allied Chemical Corporation, New York, N.Y., a corporation of New York
No Drawing. Filed July 18, 1960, Ser. No. 43,683
13 Claims. (Cl. 260—45.8)

This application is a continuation-in-part of my application Serial No. 616,130, filed October 16, 1956, for "Nylon Stabilized Against Hot Water."

This invention relates to a poly-omega-caproamide (nylon-6) stabilized for resistance to degradation during service at elevated temperatures, especially under moist conditions, e.g. in contact with water, especially hot water containing oxygen, e.g. hot water exposed to the air.

It has been proposed to mold nylon articles used primarily in contact with water, such as tubing, valves and washing machine parts. But such articles made from conventional nylon molding compositions have an undesirably short service life when used in contact with hot water, such as water at temperatures in the range between about 50° C. and the boiling point at the prevailing pressure.

I have now found a specific nylon composition which demonstrates greatly improved hot water service life as compared to conventional nylon, including conventional nylon molding compositions stabilized against degradation. Moreover my compositions have the flow properties requisite for satisfactory fabrication of articles, e.g. molded articles and filaments. Furthermore my compositions have been found to produce filaments having apparently unique characteristics of heat resistance when under loads such as about 2 grams per denier and higher.

My composition is a polycaprolactam nylon, more properly called a poly-omega-caproamide, in which is intimately and homogeneously incorporated an aging inhibitor which is an antioxidant for rubber and contains as major ingredient a water-insoluble diarylamine-ketone condensation product. Suitably the amount of the above specified condensation product used in my composition is in the range between about 0.1 part and about 10 parts by weight per 100 parts by weight of polycaprolactam; and can be higher e.g. in compositions to be used as master mixes, e.g. up to 25% by weight.

Generally those articles which are used in contact with hot water are fabricated by molding or extrusion, e.g. tubing, valves, washing machine parts, etc. Accordingly, my compositions suitable for use in these articles will employ a molding grade of polycaprolactam characterized by reduced viscosity in the range between about 1.5 and about 3.5 (in units of deciliters per gram). For production of filaments a lower range of reduced viscosities is usually preferred, namely about 1 to 2 deciliters per gram. Reduced viscosity in the sense the term is used herein is defined as:

Reduced viscosity=(time of efflux of solution divided by time of efflux of solvent from same orifice) −1, all divided by concentration of solution expressed as grams of polymer per 100 cc. of solvent.

The required measurements are made in meta-cresol solvent at 25° C. and at concentration of about 0.5 gram of polymer per 100 cc. of solvent.

For making quantitative comparison of value of various nylon compositions for articles to be used at elevated temperatures under moist conditions, e.g. in contact with hot water, I have found the following test method is suitable. The nylon composition is extruded from a melt as a monofil and is stretched to produce an oriented filament of 0.015 inch diameter. Typically the monofil will be stretched at about 4–5:1 ratio, i.e. by about 300%–400%. The elongation at break in percent (UE) and the tensile strength at break in grams per denier (UTS), both based on the dimensions of the original oriented 15 mil filament, are measured. Then the filament is immersed in boiling water through which oxygen is bubbled. The relative resistance of the composition to the degrading effect of the hot water is measured by the percentage loss in UE and UTS as shown by tests of samples.

Specifically, the monofilaments are wrapped in a single layer around aluminum or stainless steel rods ¾ inch in diameter and placed in distilled water in a glass flask. Oxygen is bubbled in below the surface of the water which is maintained at 100° C. by reflux. The water is changed every 24 hours. The monofilaments are removed periodically, conditioned to equilibrium at 50% relative humidity and 75° F. The monofilaments are tested for elongation and tensile strength and an average value of at least 3 tests is reported.

The following table shows typical results obtained by the above tests exemplifying my compositions and showing superiority thereof over broadly similar compositions for uses involving contact with hot water. In the table "A" is a commercial product, a polycaprolactam molding composition stabilized against degradation; "B" is another manufacturer's commercial polycaprolactam molding composition stabilized against degradation; "C" is a polycaprolactam molding composition stabilized against degradation by incorporation of cupric acetate which polycaprolactam has reduced viscosity in the range between about 1.5 and about 3.5; and "D" and "E" are polycaprolactam molding compositions of polycaprolactam of reduced viscosity in the range between about 1.5 and about 3.5 containing respectively about 1 percent by weight of the commercial rubber antioxidant sold as "Aminox" and that sold as "Flexamine." "Aminox" is described by the manufacturer as "a low temperature reaction product of diphenylamine and acetone"; and "Flexamine" is described by the manufacturer as "a physical mixture of: 65% of a complex diarylamine-ketone reaction product; 35% of N,N'-diphenyl-p-phenylene diamine." More specifically, the diarylamine-ketone reaction product in "Flexamine" is a high temperature, high pressure condensation product of diphenylamine and acetone, modified by after-treatment with formaldehyde to form therefrom a water-insoluble solid, fusible condensation product.

The diarylamine-ketone condensation products are well known as a distinct class among the various classes of rubber antioxidant compounds. They are water-insoluble and are characterized by having, as essential structural unit, the meso-dialkylacridan nucleus of formula:

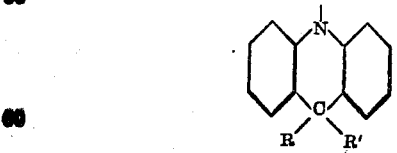

wherein R and R' are alkyl groups. Particularly pertinent disclosures relating to diarylamine-ketone condensation products as used in this invention are the following:

U.S. Patent 1,906,935 of May 2, 1933, and U.S. Patent 1,975,167 of October 2, 1934, show typical high temperature, high pressure processes for condensation of diarylamines broadly with aliphatic ketones broadly, in presence of a catalyst such as iodine, hydrogen chloride, heavy metal iodides, etc. to obtain rubber antioxidants. The specific reactions disclosed in the examples are condensations of diphenylamine and of the phenyl naphthylamines with acetone at about 210° C.–260° C. and autogenous pressure whereby dark brown, viscous condensation products are formed. Patent 1,906,935 further shows modifying these condensation products by reacting them with broadly an aliphatic aldehyde in widely varying proportions, specifically in the examples reacting diphenylamine-acetone condensation products with formaldehyde, acetaldol, and butyraldehyde.

U.S. Patent 2,002,642 of May 28, 1935, shows typical processes of condensing diarylamines and aliphatic ketones at relatively low temperatures and low pressures in presence of a hydrogen halide as catalyst to obtain rubber antioxidants.

U.S. Patent 2,562,802 of July 31, 1951, discloses that diphenylamine-acetone antioxidant condensation products vary in nature depending on conditions of condensation; and cites as the extremes, the solid materials formed in accordance with U.S. Patent 2,002,642 above-cited versus the heavy liquid formed in accordance with U.S. Patent 1,975,167 above-cited.

Accordingly on the basis of the art, "Aminox" and "Flexamine" used respectively in compositions "D" and "E" of the table below are representative of the diarylamine-ketone condensation product class of rubber antioxidants.

TABLE

| Nylon composition | 1 Week, percent Loss of— | | 2 Weeks, percent Loss of— | | 3 Weeks, percent Loss of— | | 5 Weeks, percent Loss of— | |
|---|---|---|---|---|---|---|---|---|
| | UE | UTS | UE | UTS | UE | UTS | UE | UTS |
| A | 42.7 | 15.8 | 37.5 | 18.4 | 48.5 | 20.7 | | |
| B | 71.2 | | 88.4 | 54.2 | (Test terminated) | | | |
| C | 13.0 | 22.0 | 63.7 | 70.6 | 83.7 | 91.2 | | |
| D | 13.0 | 20.7 | 9.7 | 22.0 | 17.3 | 22.6 | 14.5 | 23.1 |
| E | 14.2 | 32.7 | 18.6 | 32.9 | 12.5 | 34.6 | | |

The stabilizers were incorporated in compositions "C," "D," and "E" of the table in the following manner:

The stabilizer was blended for 30 minutes at room temperature or above with polycaprolactam pellets measuring 0.1" x 0.1" in the form of cylinders. The blender used was a Reed sigma blade mixer, but a ribbon type or tumbling type are just as good. In some cases the temperature of the blend was raised to melt the stabilizer onto the pellet to give a uniform coating.

The blend was then fed into an extruder and processed into 15 mil filaments (oriented). A heavy screen pack of 150, 120, 80, and 40 mesh screens was used to insure good mixing in the extruder. The extruder was a 1½" electrically heated unit. The die opening was about 0.067" and the melt temperature in the die head was maintained at about 260° C. The monofilaments were drawn at 4:1 ratio and wrapped on spools.

A like molding composition similar to "D" and "E" of the table but having 1% of N,N'diphenyl-paraphenylene diamine as the sole antioxidant was not as resistant as compositions "D" and "E" but showed some advantage over the comparison compositions. Its 3-week losses of UE and UTS, in percent, were respectively 31%, 45%.

The need of improving the service life of nylon in various applications has long been recognized and a great variety of aging inhibitors has been suggested for improving resistance of nylon to ordinary exposure to heat, oxygen and light. Antioxidants for improving aging characteristics of rubber, e.g. in tires and wire insulation have long been known. It was indeed unexpected now to find that the above specified rubber antioxidants would be highly effective for stabilizing polycaprolactam nylon against deterioration by contact with hot water, where known nylon degradation inhibitors are relatively ineffective.

My compositions have special utility in molded articles to be used in contact with water, especially water at temperatures of about 50° C. to boiling point under the prevailing pressure. They also have general utility for fabricating articles for other service where stabilization against aging is desirable.

As is apparent from the foregoing, my compositions can be formed into filamentary articles such as monofils and multifilament yarns. It has been found that my compositions are peculiarly adapted for use in tire yarn. This special utility is due not only to the ability of these compositions to resist heat, oxygen and moisture as is desirable in such yarns, but also is due to a specific effect of these condensation products upon specifically polycaprolactam, whereby the resistance of the polycaprolactam to breaking at elevated temperatures while under load is greatly improved. In the table which follows these effects are shown by comparisons between a polycaprolactam monofil with no stabilizer (control) and polycaprolactam monofils, A, B and C, each containing 1% by weight of respectively (A) A rubber antioxidant, "Flexamine," which is about 35% by weight, N,N'-diphenyl-p-phenylenediamine and 65% by weight reaction product of acetone and diphenylamine formed at relatively high temperatures and high pressures, containing the meso-dimethyl acridan nucleus, and further reacted with formaldehyde to form a water-insoluble solid, fusible condensation product as described in U.S. Patent 1,906,935 of May 2, 1933, to Horst, in particular in Example A and Example I thereof. Said reaction product of acetone and diphenylamine is supplied by the Naugatuck Chemical Division of United States Rubber Co. under the trade name "BXA." "BXA" is described by the supplier as having specific gravity 1.10; melting range 85° to 95° C.; soluble in acetone, benzene, ethylene dichloride; insoluble in water and gasoline. The antioxidant "Flexamine" is also supplied by Naugatuck. It is described by the supplier as having specific gravity 1.20; melting range 75° C. to 90° C.; soluble in acetone, benzene, ethylene dichloride; insoluble in water and gasolene. A purified form of "Flexamine," available from Naugatuck, known as "BLE Powder" is useable in my composition similarly to "Flexamine."

(B) A rubber antioxidant consisting essentially of the above described acetone/diphenylamine high temperature, high pressure condensation product aftertreated with formaldehyde, viz. "BXA" above described.

(C) A rubber antioxidant, the heavy viscous liquid product of high temperature, high pressure condensation of diphenylamine and acetone in accordance with U.S. Patent 1,906,935 above cited, Example A; available from Naugatuck under the designation "BLE-25." Specific gravity 1.087; soluble in acetone, benzene, ethylene dichloride; insoluble in gasoline and water.

By way of comparison showing the effect to be specific to polycaprolactam, the table shows comparison tests upon nylon-6,6 monofils without stabilizer and with 1 percent each of stabilizers as for polycaprolactam monofils A and B above.

The samples tested in accordance with the below table were prepared by dry blending the solid stabilizers (those of monofils A and B above) with granules of the polymer at room temperature in a ball mill; and by blending the viscous liquid stabilizer of monofil C with polymer granules in a sigma blender at 71° C. for 30 minutes.

The stabilized polycaprolactam compositions of this invention can likewise be made by incorporating the stabilizer with a caprolactam polymerization reaction mixture at any desired stage before, during, or after the polymerization. The stabilizers can also be incorporated in the polycaprolactam from solution of the stabilizer, e.g. an acetone solution, by thoroughly contacting said solution with finely divided polycaprolactam and thereafter molding, spinning, etc.

The resulting compositions of the above blending procedure were melt extruded as monofils by the same procedure above described in connection with the hot water tests. The resulting monofils were drawn at ratios of 4.86:1 for the polycaprolactam samples and 4.52:1 for the nylon-6,6 samples. The high draw ratio with the polycaprolactam samples containing stabilizer reflects the good compatibility of these stabilizers with polycaprolactam. It will be noted from the table that the stabilized polycaprolactam samples actually had higher ultimate tensile strength (UTS) than the unstabilized control, whereas slightly lower UTS was observed in the stabilized nylon-6,6 monofils than in the control.

TABLE
*Breaking temperature vs. load*

| | Denier | UTS, g./d. | UE, percent | Loads Used | | |
|---|---|---|---|---|---|---|
| | | | | 100 gms. | 1400 gms. | 1600 gms. |
| | | | | °C.[1] | °C.[1] | °C.[1] |
| Polycaprolactam Monofils: | | | | | | |
| Control | 490 | 5.5 | 23.4 | 234 | 208 | 167 |
| A | 497 | 6.3 | 25.8 | 233 | 234 | 200 |
| B | 528 | 6.24 | 19.3 | 232 | 228 | 222 |
| C | 464 | 6.6 | 21.7 | 232 | 227 | 196 |
| Nylon-6,6 Monofils: | | | | | | |
| Control | 498 | 6.2 | 22.2 | 264 | 213 | 162 |
| A | 496 | 5.3 | 22.5 | 265 | 218 | 164 |
| B | 573 | 5.0 | 18.3 | 267 | 194 | 151 |

[1] Breaking temperatures.

In the above tests, monofils under the specified loads (100, 1400, and 1600 gms.) were placed against a heated block. The block temperature was raised 5° C. per minute and the temperatures at which the monofils broke were recorded. Initial block temperatures varied from 30° C. to 70° C. below the recorded break temperatures.

Tests of a similar nature can be made in which a drawn yarn (e.g. 840 denier, 136 filament) is loaded (e.g. at 7.5 pounds) and is maintained at a given temperature e.g. in the range 155° C.–180° C. by contact with a heated block; and the time to break is recorded. Such tests parallel the above, showing e.g. at 165° C. an average time to break for an 840 denier, 136 filament yarn from polycaprolactam composition "A" of the above table, of about 13 minutes versus less than one minute for a like yarn from unstabilized polycaprolactam. Such tests have likewise shown that merely coating the yarn with the stabilizer of composition "A" by applying thereto a solution of the stabilizer has very little beneficial effect.

I claim:
1. A polycaprolactam nylon composition in which is incorporated an aging inhibitor which contains a water-insoluble solid fusible diarylamine-ketone product of low temperature condensation.

2. Composition as defined in claim 1 wherein said aging inhibitor is present in amounts between about 0.1 part and about 10 parts by weight per 100 parts by weight of polycaprolactam nylon.

3. Composition as defined in claim 2 wherein the polycaprolactam nylon is a molding grade nylon having reduced viscosity in the range between about 1.5 and about 3.5.

4. A polycaprolactam nylon composition in which is incorporated an aging inhibitor which contains a diarylamine-ketone condensation product after-treated with formaldehyde to form therefrom a water-insoluble solid, fusible condensation product.

5. Composition as defined in claim 4 wherein the aging inhibitor is present in amounts between about 0.1 part and about 10 parts by weight per 100 parts by weight of polycaprolactam nylon.

6. Composition as defined in claim 4 wherein the diarylamine is diphenylamine and the ketone is acetone.

7. Composition as defined in claim 4 wherein the aging inhibitor contains a major proportion of said solid, fusible condensation product and a minor proportion of N,N'-diphenyl-p-phenylenediamine.

8. Composition as defined in claim 7 wherein the diarylamine is diphenylamine, the ketone is acetone, and the aging inhibitor is present in amounts between about 0.1 part and about 10 parts by weight per 100 parts by weight of polycaprolactam nylon.

9. A poly-omega-caproamide composition in which is incorporated an aging inhibitor which contains a water-insoluble diarylamine-ketone condensation product characterized by having, as essential structural unit, the meso-dialkylacridan nucleus of formula:

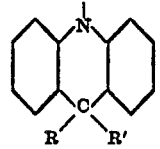

wherein R and R' are alkyl groups.

10. Composition as defined in claim 9 in the form of an oriented filament.

11. Composition as defined in claim 10 wherein the aging inhibitor contains predominantly the said condensation product from diphenylamine as the diarylamine, and from acetone as the ketone, the amount of said condensation product in the composition being between about 0.1 part and about 10 parts by weight per 100 parts by weight of polycaproamide.

12. Composition as defined in claim 11 wherein said condensation product is a high temperature, high pressure condensation product modified by after treatment with formaldehyde to form therefrom a water-insoluble, solid, fusible condensation product.

13. A polycaprolactam nylon composition, in the form of an oriented filament, in which is incorporated an aging inhibitor in amounts between about 0.1 part and about 10 parts by weight per 100 parts by weight of polycaprolactam nylon, which aging inhibitor contains as major ingredient a water-insoluble diphenylamine-acetone condensation product after-treated with formaldehyde to form therefrom a water-insoluble solid, fusible condensation product.

References Cited in the file of this patent

UNITED STATES PATENTS

| 1,906,935 | Ter Horst | May 2, 1933 |
| 1,975,167 | Meuser | Oct. 2, 1934 |
| 2,002,642 | Meuser | May 28, 1935 |
| 2,562,802 | Mankowich et al. | July 31, 1951 |

FOREIGN PATENTS

| 906,892 | France | Feb. 22, 1946 |

OTHER REFERENCES

"The Condensed Chemical Dictionary," Reinhold (1956), p. 67.

Williams: "Non-Staining Antioxidants," Institution of Rubber Industry Proceeding, London, February 1956, vol. 32, No. 1, pp. 45, 49, and 50.